US011267415B2

(12) United States Patent
Akella et al.

(10) Patent No.: US 11,267,415 B2
(45) Date of Patent: Mar. 8, 2022

(54) VEHICLE RECOMMENDATION AND TRANSLATION SYSTEM FOR SETTING PERSONALIZED PARAMETERS WITHIN VEHICLES OF MOBILITY SHARING ENVIRONMENTS

(71) Applicants: DENSO International America, Inc., Southfield, MI (US); DENSO CORPORATION, Kariya (JP)

(72) Inventors: Ravi Akella, San Jose, CA (US); Haris Volos, Sunnyvale, CA (US); Yunfei Xu, Milpitas, CA (US); Takashi Bando, Mountain View, CA (US)

(73) Assignees: DENSO International America, Inc., Southfield, MI (US); DENSO CORPORATION, Aichi-pref. (JP)

( * ) Notice: Subject to any disclaimer, the term of this patent is extended or adjusted under 35 U.S.C. 154(b) by 176 days.

(21) Appl. No.: 16/001,439

(22) Filed: Jun. 6, 2018

(65) Prior Publication Data
US 2019/0375354 A1    Dec. 12, 2019

(51) Int. Cl.
*B60R 16/037*   (2006.01)
*H04L 12/40*   (2006.01)

(52) U.S. Cl.
CPC .. *B60R 16/037* (2013.01); *H04L 2012/40215* (2013.01)

(58) Field of Classification Search
CPC ......... B60R 16/037; H04L 2012/40215; H04L 67/306; H04L 67/304; B60Y 2302/07; B60Y 2040/0809; B60Y 2050/0005

USPC ............................................. 701/36
See application file for complete search history.

(56) References Cited

U.S. PATENT DOCUMENTS

| 6,944,430 | B2 * | 9/2005 | Berstis ................. G11B 27/002 369/30.08 |
| 7,346,370 | B2 * | 3/2008 | Spaur .................. H04L 12/4625 340/3.1 |
| 8,634,822 | B2 * | 1/2014 | Silver ............... H04M 1/72577 455/420 |
| 8,706,349 | B2 * | 4/2014 | Rector .............. H04M 1/72577 701/36 |
| 9,147,296 | B2 * | 9/2015 | Ricci ..................... H04W 4/21 |

(Continued)

*Primary Examiner* — Angelina Shudy
*Assistant Examiner* — Mohamed Abdo Algehaim
(74) *Attorney, Agent, or Firm* — Harness, Dickey & Pierce, P.L.C.

(57) ABSTRACT

A system for setting parameters within a first vehicle for a first user of the first vehicle is provided and includes a memory, transceiver, and a processing module. The memory stores normalized parameters, which are specific to the first user. Each of the normalized parameters is a parameter of the vehicle. The transceiver receives the normalized parameters from a mobile device of the first user, a server in a cloud-based network, or a portable memory device. The processing module: determines whether the first user is authorized for parameter translation services; if the first user is authorized for parameter translation services, translates the normalized parameters to resultant parameters; generates parameter recommendations based on the resultant parameters; presents the parameter recommendations to the first user; and adjusts current parameters of the first vehicle based on the resultant parameters and a received response from the first user with regards to the parameter recommendations.

29 Claims, 9 Drawing Sheets

(56) References Cited

U.S. PATENT DOCUMENTS

| | | | | |
|---|---|---|---|---|
| 9,547,692 B2* | 1/2017 | Poulsen | G06F 3/04883 | 701/36 |
| 10,218,771 B2* | 2/2019 | Penilla | G06F 17/00 | |
| 2003/0204296 A1* | 10/2003 | Galli | B60R 16/037 | 701/49 |
| 2004/0255299 A1* | 12/2004 | Brenner | G06F 9/4843 | 718/102 |
| 2006/0123081 A1* | 6/2006 | Baudino | G06Q 30/02 | 709/204 |
| 2013/0099892 A1* | 4/2013 | Tucker | G07C 9/00309 | 340/5.61 |
| 2013/0226449 A1* | 8/2013 | Rovik | G01C 21/362 | 701/424 |
| 2014/0172727 A1* | 6/2014 | Abhyanker | G06Q 50/30 | 705/307 |
| 2014/0244106 A1* | 8/2014 | Singer | G06F 17/00 | 701/36 |
| 2014/0316609 A1* | 10/2014 | Washington | B60R 16/037 | 701/2 |
| 2015/0045988 A1* | 2/2015 | Gusikhin | G07C 9/00571 | 701/2 |
| 2015/0088337 A1* | 3/2015 | Toohy | B60W 50/0098 | 701/1 |
| 2015/0149042 A1* | 5/2015 | Cooper | H04W 4/48 | 701/48 |
| 2015/0203062 A1* | 7/2015 | Gautama | B60R 16/037 | 701/49 |
| 2015/0203125 A1* | 7/2015 | Penilla | G07C 5/0808 | 701/1 |
| 2015/0325062 A1* | 11/2015 | Mason | G07C 5/0816 | 701/29.3 |
| 2015/0379784 A1* | 12/2015 | Gotz | G06Q 30/0201 | 701/29.1 |
| 2016/0193976 A1* | 7/2016 | Wild | G06F 3/04883 | 701/36 |
| 2017/0050645 A1* | 2/2017 | Porembski | B60R 16/037 | |
| 2017/0147935 A1* | 5/2017 | Bai | G01M 17/007 | |
| 2017/0210340 A1* | 7/2017 | Thooris | B60R 25/24 | |
| 2017/0232914 A1* | 8/2017 | Brenner | B60R 16/037 | 701/36 |
| 2017/0305437 A1* | 10/2017 | Onorato | G07C 5/08 | |
| 2018/0103022 A1* | 4/2018 | Tokunaga | H04L 63/108 | |
| 2018/0137263 A1* | 5/2018 | Kurian | G06F 21/84 | |
| 2019/0023278 A1* | 1/2019 | Lowry | B60W 50/08 | |
| 2019/0220010 A1* | 7/2019 | Leonard | B60W 50/10 | |
| 2019/0251509 A1* | 8/2019 | Simpson | G06Q 10/08355 | |

* cited by examiner

VEHICLE RECOMMENDATION AND TRANSLATION SYSTEM FOR SETTING PERSONALIZED PARAMETERS WITHIN VEHICLES OF MOBILITY SHARING ENVIRONMENTS

FIELD

The present disclosure relates to setting personalized parameters within vehicles of mobility sharing environments.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Automotive vehicles have traditionally been purchased and used as a main form of transportation. There is an increasing trend away from vehicle ownership. As a first alternative to purchasing a vehicle, a vehicle may be rented by a customer from a vehicle rental company. As a second alternative, a vehicle may be shared by multiple users via a "car sharing" service.

SUMMARY

A system for setting parameters within a first vehicle for a first user of the first vehicle is provided. The system includes a memory, transceiver, and a processing module. The memory is configured to store normalized parameters. The normalized parameters are specific to the first user. Each of the normalized parameters is a parameter of the vehicle. The transceiver is configured to receive at least some of the normalized parameters from at least one of a mobile device of the first user, a server in a cloud-based network, or a portable memory device. The processing module is configured to: determine whether the first user is authorized for parameter translation services; if the first user is authorized for parameter translation services, translate the normalized parameters to resultant parameters; generate parameter recommendations based on the resultant parameters; present the parameter recommendations to the first user; and adjust current parameters of the first vehicle based on (i) the resultant parameters, and (ii) a received response from the first user with regards to the parameter recommendations.

In other features, a method of setting parameters within a first vehicle for a first user of the first vehicle is provided. The method includes storing in one or more memories normalized parameters. The normalized parameters are specific to the first user. Each of the normalized parameters is a parameter of the vehicle. The method further includes: receiving at least some of the normalized parameters from at least one of a mobile device of the first user, a server in a cloud-based network or a portable memory device; determining whether the first user is authorized for parameter translation services; if the first user is authorized for parameter translation services, translating the normalized parameters to resultant parameters; generating parameter recommendations based on the resultant parameters; presenting the parameter recommendations to the first user; and adjusting current parameters of the first vehicle based on (i) the resultant parameters, and (ii) a received response from the first user with regards to the parameter recommendations.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
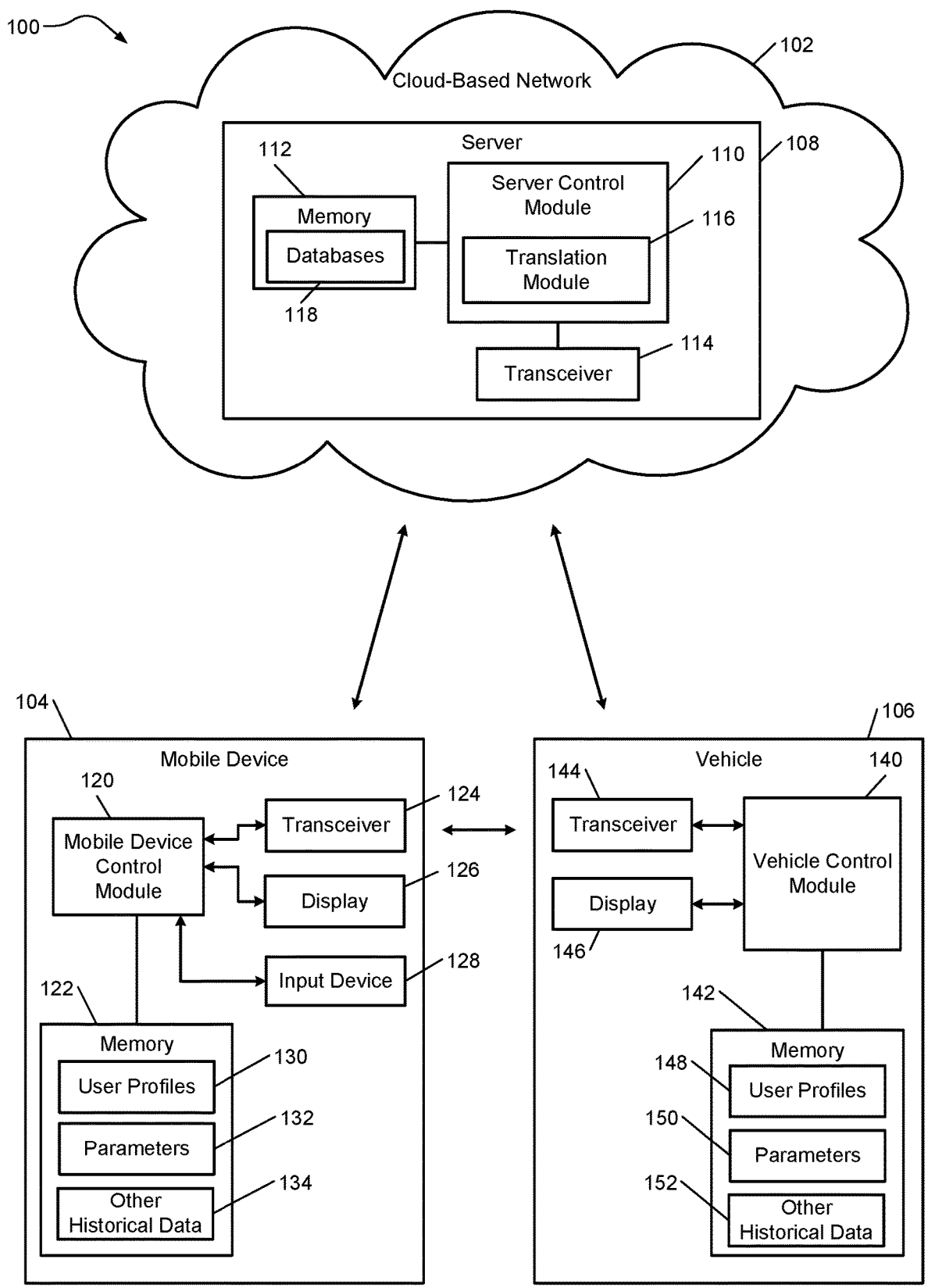
FIG. 1 is a functional block diagram of an example of a vehicle recommendation and translation system in accordance with an embodiment of the present disclosure.

Each time a person rents a vehicle and/or obtains access to and drives a car sharing vehicle, the user needs to adjust settings within the vehicle. The settings include driver seat forward and backward positions, seat back angles, lumbar supports, mirror positions, radio stations, climate control settings, etc. This can be time consuming. Additional time may be needed when the user switches between vehicles of different years, makes, models and trim levels (collectively referred to herein as "vehicle types"). This is because the user is not accustomed to the current vehicle and may be unsure how to make certain adjustments and/or may be unsure as to what are the preferred settings of the user for that particular vehicle.

Systems and methods are set forth herein that provide a seamless personalized user experience across different vehicle types. The disclosed methods are implemented to provide a seamless experience for users when switching vehicles and when obtaining access to vehicles for a first time. The seamless experience is also provided for a user when obtaining access to a vehicle for a first time since another user has obtained access to and/or driven the vehicle. In being "seamless", a first user is able to access and operate a vehicle for a first time since a second user has operated the vehicle and have the feeling that no other person used this vehicle since the last time the first user used the vehicle. Vehicle parameters are automatically adjusted after being used by the second user and after authentication and provided access to the first user. The parameters are set to match parameters previously set for the first user during a previous use of the vehicle by the first user.

As another example, a first vehicle may automatically adjust vehicle parameters for a user that match vehicle parameters previously set in a second vehicle for the user. The second vehicle may be the same vehicle type as the first vehicle. The first vehicle may be used for a first time by the user and after the user operated the second vehicle. In doing so, the user may have the opinion that the first vehicle is setup the same as the second vehicle.

As yet another example, a first vehicle may automatically adjust vehicle parameters for a user that match and/or correspond to vehicle parameters previously set in a second vehicle for the user. The second vehicle may be a different vehicle type than the first vehicle. The first vehicle may be used for a first time by the user and after the user operated the second vehicle. In doing so, the user may have the opinion that the first vehicle has been custom configured (or setup) for the user.

Other examples are described below. Some of the examples include setting parameters in a first vehicle for a first user based on parameters set in the first vehicle and/or other vehicles for other users.

The seamless experience is provided across various vehicle types (i.e. makes and/or models) and for various mobility sharing environments, such as a family vehicle sharing environment, a car sharing environment, a rental vehicle environment, etc. The systems and methods may also be applied to other vehicles used in non-sharing mobility environments, such in individually purchased vehicles. The disclosed systems create store and utilize user profiles that are fitted, translated and used for setting, estimating, suggesting and predicting appropriate settings (or parameters) for current (or target) vehicles of corresponding vehicle environments.

FIG. 1 shows a vehicle recommendation and translation system 100 that includes a cloud-based network 102, a mobile device 104, and a vehicle 106. The cloud-based network 102 includes one or more servers (one server 108 is shown). Although a single mobile device 104, a single vehicle 106 and a single server 108 are shown, any number of each may be included in the vehicle recommendation and translation system 100. The server 108 may include a server control module 110, a memory 112, and a transceiver 114. The server control module 110 includes a translation module 116. The memory 112 may store databases 118 having various information, such as user profiles, vehicle parameters, vehicle data, and other historical data. A user may have one or more user profiles, where each user profile includes personalized parameters set and/or selected by a user for one or more vehicle types. The content of a user profile is further described below. The user profile may include vehicle parameters preferred by the corresponding user. The vehicle parameters may include, for example, seat settings, radio settings, climate control settings, lighting settings, and/or other vehicle settings preferred and able to be set by a user. The vehicle parameters may include other parameters, such as vehicle codes, transmission protocols, part and/or system dimensions, operating speeds, flow rates, etc.

Figure 2:
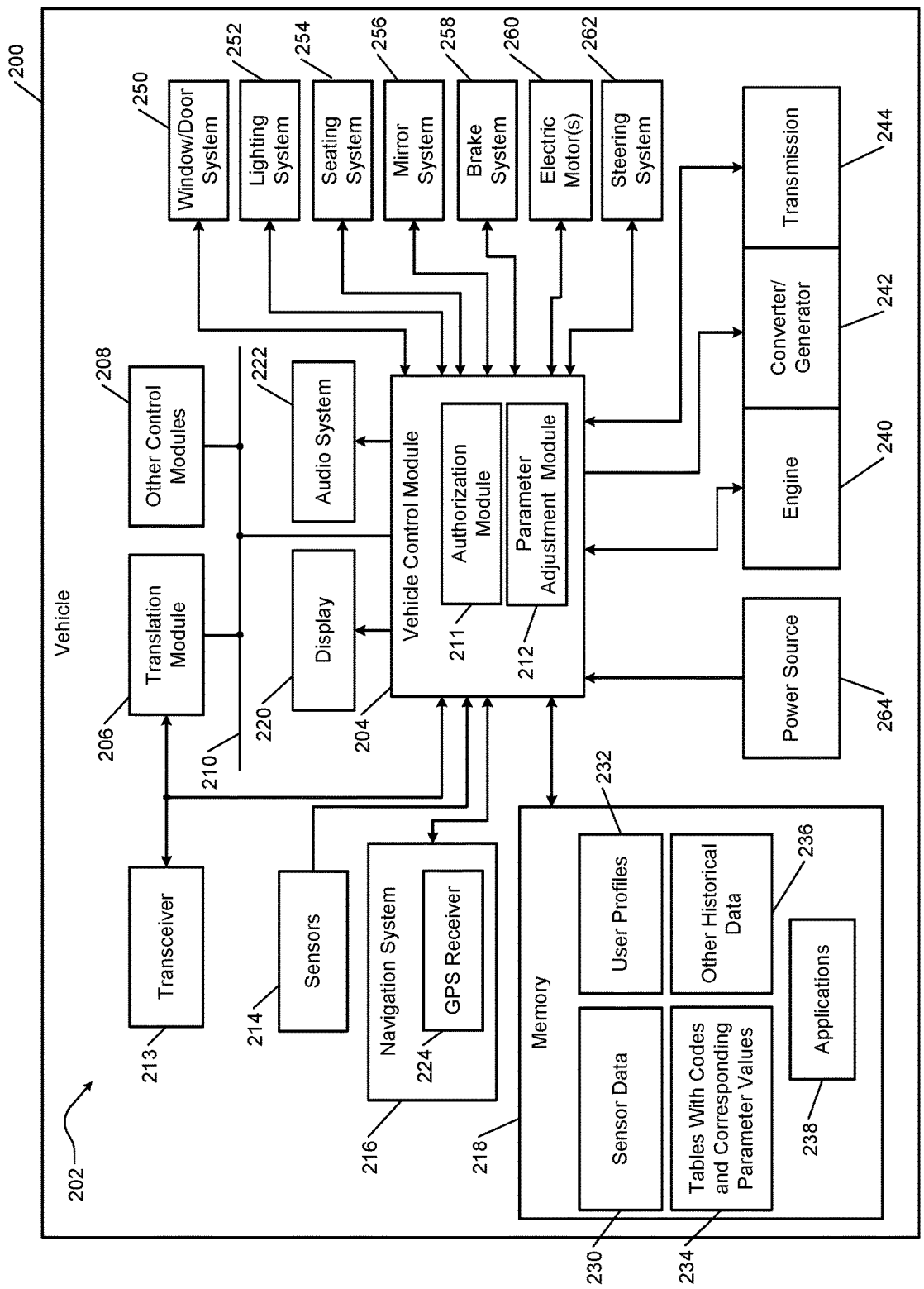
FIG. 2 is a functional block diagram of an example of a vehicle including a translation module in accordance with an embodiment of the present disclosure.

The translation module 116 translates a user profile including corresponding parameters for a particular vehicle to other user profiles for the same user, where the other user profiles include parameters for other vehicles. The translation may be based on user profiles of other users. This is further described below. The translation may be performed based on user profile data stored in a mobile device (or network device) of a user, such as in a mobile phone, a laptop computer, a wearable device, and/or other network device and provided to the translation module 116. Although the translation module 116 is shown as being implemented in a cloud-based network, the translation module 116 may be implemented in the vehicle 106. An example of a translation module being implemented in a vehicle is shown in FIG. 2. The translation module 116 may transmit a generated user profile to, for example, the vehicle 106. The vehicle 106 may then adjust vehicle parameters based on the received user profile customized for that vehicle.

The mobile device 104 may include a mobile device control module 120, a memory 122, a transceiver 124, a display 126 and an input device 128 (e.g., a touch screen, a mouse, a keyboard, etc.). The memory 122 may store user profiles 130, parameters 132, and other historical data 134. Each of the user profiles 130 may be for a particular user and a particular vehicle and include vehicle parameters as disclosed herein. The mobile device control module 120 may store user profiles received from the control module 110 and/or from control modules of vehicles (e.g., the vehicle 106).

The vehicle 106 may include a vehicle control module 140, a memory 142, a transceiver 144, and a display 146. The memory 142 may store user profiles 148, vehicle parameters 150 and other historical data 152. One or more of the user profiles 148 may match one or more of the user profiles 130. The display 146 may be a display on a dashboard of the vehicle 106, a heads-up-display, or other display within the vehicle 106. The control modules 110, 120, 140 may communicate with each other via the transceivers 114, 124, 144.

The databases 118 may include a user profile database, which stores user profiles including preferences of users for various vehicles. The data of the user profiles are analyzed by the translation module 116 to extract relationships between vehicle types when users switch vehicles. This may be based on data collected from a controller area network of one or more vehicles as described below, such as: seat angles; temperatures; mathematical model data from mathematical models; data as a result of calculations; data associated with adjustments; and other data examples of which are disclosed herein. Recommended user profiles are generated and one or more sets of user profile mapping information may be generated for translation purposes. The sets of user profile mapping information may be used to translate a current user profile (or current user parameters/preferences) for one or more previous vehicles to a new user profile for a current vehicle. Individual user parameters may be compared and similarities between users and/or user parameters may be stored. Accordingly, when a user drives a new vehicle, a new set of settings are offered for the user to accept and/or modify.

The examples set forth herein are applicable to (i) multiple personal vehicles, such as that used in a mobility sharing environment, and (ii) various user settings. The user preference parameters may be saved in a user's personal device (e.g., the mobile device 104) and/or in the cloud-based network 102. The translation module 116 provides recommended parameters based on similar attributes and translates parameters previously set for a first vehicle to parameters for a second vehicle of the same or different type. The system 102 is not dependent on connections between user devices and accounts for physical properties of the attributes to be applied (e.g., seat dimensions, heating ventilation and air-conditioning (HVAC) capabilities, etc.). The parameters are adapted from one vehicle to another vehicle that may have heterogeneous attributes based on build, model, etc. The translation module 116 is able to generalize to unseen environments and incorporates machine learning techniques for user profiles to recommend and translate parameters.

FIG. 2 shows a vehicle 200 that may include an operating system 202. The vehicle 200 may replace and/or operate similarly to the vehicle 106 of FIG. 1. The operating system 202 may include a vehicle control module 204, a translation module 206, and other control modules 208, which may communicate with each other via a controller area network (CAN) bus 210. Although the examples disclosed herein are primarily described with respect to communication over a network including one or more CAN buses, the examples may be applied to and/or include other in-vehicle networks such as Flexray™, automotive Ethernet, etc. The translation module 206 may operate similarly to the translation module 116 of FIG. 1. The vehicle control module 204 may operate similar to the vehicle control module 140 of FIG. 1 and includes an authorization module 211, a parameter adjustment module 212, and/or other modules, such as an autonomous control module, engine control module, a transmission control module, and a motor control module, etc. The authorization module 211 may control access to an interior of the vehicle 200 and access to user profile translation services, as described further below. The parameter adjustment module 212 may be used to adjust parameters of the vehicle 200.

The operating system 202 may further include a transceiver 213, sensors 214, a navigation system 216, a memory 218, a display 220 and an audio system 222. The sensors 214 may include cameras, objection detection sensors, temperature sensors, and/or other sensors that provide parameters and/or data associated with the state of the vehicle 200, state of objects within the vehicle, and/or information regarding an environment in which the vehicle 200 is located. The sensors 214 detect environmental conditions and status of vehicle devices. The navigation system 216 may include a global positioning system (GPS) receiver 224.

The memory 218 may store sensor data and/or parameters 230, user profiles 232, tables 234 with codes and corresponding parameter values (or parameters), other historical data 236, and applications 238. The applications 238 may include applications executed by the modules 204, 206, 208. As an example, one of the applications may be a translation application executed by the translation module 206 and used to convert (or translate) user profiles and/or corresponding parameters.

The vehicle control module 204 may control operation of an engine 240, a converter/generator 242, a transmission 244, a window/door system 250, a lighting system 252, a seating system 254, a mirror system 256, a brake system 258, electric motors 260 and/or a steering system 262 according to parameters set by the modules 204, 206, 208. The vehicle control module 204 may receive power from a power source 264 which may be provided to the engine 240, the converter/generator 242, the transmission 244, the window/door system 250, the lighting system 252, the seating system 254, the mirror system 256, the brake system 258, the electric motors 260 and/or the steering system 262, etc.

The translation module 206 may generate output signals including parameter settings via the display 220. The translation module 206 may communicate with and/or receive user profile data from one or more mobile devices (e.g., the mobile device 104 of FIG. 1), cloud-based network servers (e.g., the cloud-based network server 108 of FIG. 1) and/or other vehicles via the transceiver 213.

The engine 240, the converter/generator 242, the transmission 244, the window/door system 250, the lighting system 252, the seating system 254, the mirror system 256, the brake system 258, the electric motors 260 and/or the steering system 262 may include actuators controlled by the vehicle control modules 204 to, for example, adjust fuel, spark, air flow, throttle position, pedal position, door locks, window position, seat angles, lumbar support positions and/or pressures, mirror position, stereo presets, etc. This control may be based on the outputs of the sensors 214, the navigation system 216, and the GPS 224. The stated control may also be performed to match parameters of a user profile, which may be adjusted by a user. The audio system 222 may include a stereo having channel presets and volume settings that maybe set by a user and adjusted according to a user profile by one or more of the modules 204, 206, 208.

A user profile may include various vehicle parameters set for a particular user. The vehicle parameters may include set parameters, mirror parameters, window parameters, door parameters, lighting parameters, vehicle-to-infrastructure (V2X) parameters, driver assistance and safety parameters, driving parameters, infotainment parameters, security parameters, dashboard parameters, etc. For example, seat parameters may include: seat positions; heights; seat back and seat pan inclination angles; lumbar support positions; pressures; and/or states; and head restraint positions. Mirror parameters may include rear and side view mirror positions and/or tinting values. Window parameters may include: adaptive tint values; moon roof positions, which may be weather dependent; and passenger window control setting values.

Figure 6:
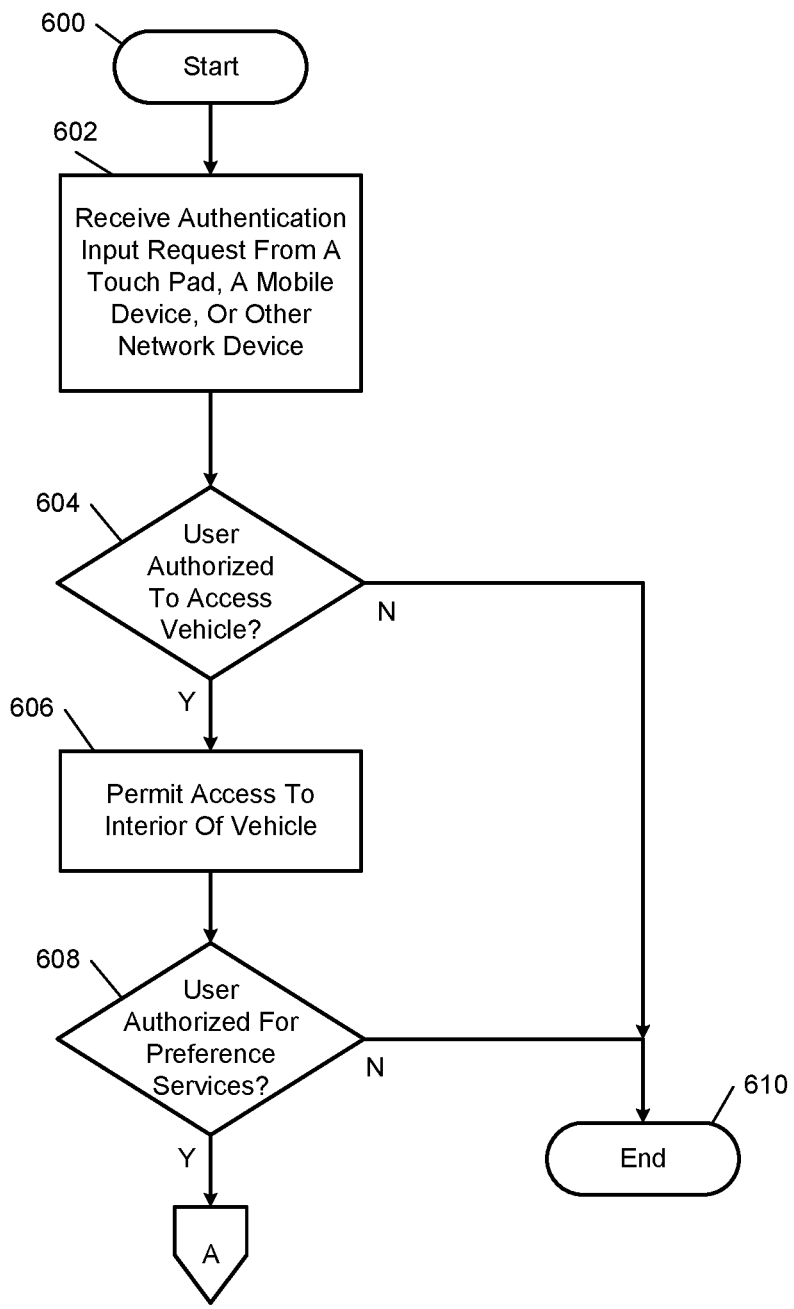
FIG. 6 illustrates an example authentication method in accordance with an embodiment of the present disclosure.

Door parameters may include door locking and unlocking policies, for example, unlock all doors or just a driver door when an unlock button is depressed once or when access to the vehicle is granted. For example, when the method of FIG. 6 is performed and access is granted a driver door or all doors may be unlocked depending on the unlocking policy stored.

Lighting parameters may include a value indicating whether fog lights are ON or OFF, a headlight inclination (e.g., high or low) angle, a wide/narrow lighting angle, and intensity levels. Different lighting parameters may be used for different weather conditions, time of day, and/or geographical region of the vehicle. Different light parameters may be used based on whether other vehicles or pedestrians are within a predetermined range of the host vehicle for which the parameters are being adjusted.

V2X parameters may include protocol preferences for sharing information and applications permitted to interact with other vehicles and/or infrastructure. Driver assistance and safety parameters may include: a value indicating whether radar sensing is ON or OFF; a radar sensitivity; a radar display setting; a value indicating whether lane keeping warning and/or assistance system is ON or OFF; a lane keeping warning and/or assistance sensitivity; a value indicating whether a forward collision warning and/or collision mitigation system is ON or OFF; cruise control parameters, such as an automatic distance keeping parameter and semi-automatic driving and preference values; camera assistance system parameters; automatic parking system parameters; etc.

Driving parameters may include preferred transmission settings (e.g., sports, manual, eco, shifting points, et.) and suspension parameters. Infotainment parameters may include paired phone settings, phone book and reading of messages settings, a policy for transferring application profiles, stereo settings, etc. Security parameters may include alarm settings including alarm sensitivity settings. Dashboard parameters may include color settings; intensities; permitted application screens (e.g., navigation screens; safety notice screens; augmented maps of surroundings using radar systems; and camera view screens); fuel economy, miles-per-gallon and corresponding feedback parameters; and electric/hybrid vehicle status, battery status, regenerative braking status, and visuals.

During operation, a user obtains access to and enters the vehicle 200 and the vehicle 200 is configured based on previous user parameters (or settings) and/or based on recommendations and/or suggestions. The recommendations and/or suggestions may be determined by the translation module 206 based on average and/or popular settings selected by similar users (e.g., users having similar demographic data). The user demographic data may include user age, weight, height, gender, music preferences, living area, occupation, marital/family status, education level, ethnic background, etc., and other demographic data such as geographical region of vehicle. The current user may make final adjustments to at least some of the parameters, which may already be close to preference values of the user. The parameters may be saved in the memory 218, sent to the server 108 of FIG. 1 and saved in the memory 112, and/or saved in the memory 122 of the mobile device 104. The operating system 202 uses the saved settings to build a user profile and update one or more recommended user profiles for similar vehicles and/or for similar users.

Use Case—Vehicle Shared Among Multiple Users

The vehicle 200 may be shared among multiple people such as: family members, a group of friends, employees of a company, etc. As an example, each of the users may have used the vehicle 200 at least once and has selected and saved his/her preferred parameters/settings. User A uses the vehicle 200 with his/her own settings. After user A is done using the vehicle 200, then user B uses the vehicle 200. As soon as user B enters the vehicle 200, the previous parameters/settings for user B are applied and as far as user B is concerned, no one else has used the vehicle 200 since the last time user B used the vehicle 200. The parameters/settings have been adjusted to be the same as the last time user B used the vehicle 200.

Use Case—Other Vehicles of Same Type

A user has used a first vehicle of the same type as that of the vehicle 200. The user selected and saved his/her preferred parameters/settings for the first vehicle. The user enters the vehicle 200, the previous parameters/settings saved for the first vehicle are set on the vehicle 200 and the vehicle 200 is indistinguishable from the point of the user from the first vehicle since the parameters/settings are the same, thereby providing a seamless experience.

New Vehicle Type

A user has used other vehicles before, but not a vehicle of the type of the vehicle 200. The user enters the vehicle 200 and the vehicle is configured using recommendations based on his/her parameters/settings in the other vehicles and recommendations corresponding to similar users for vehicles of the type of the vehicle 200. The current user may make minimal adjustments since the recommended settings are close to her/his preferences. The recommendations may be determined by the translation module 206.

Figure 3:
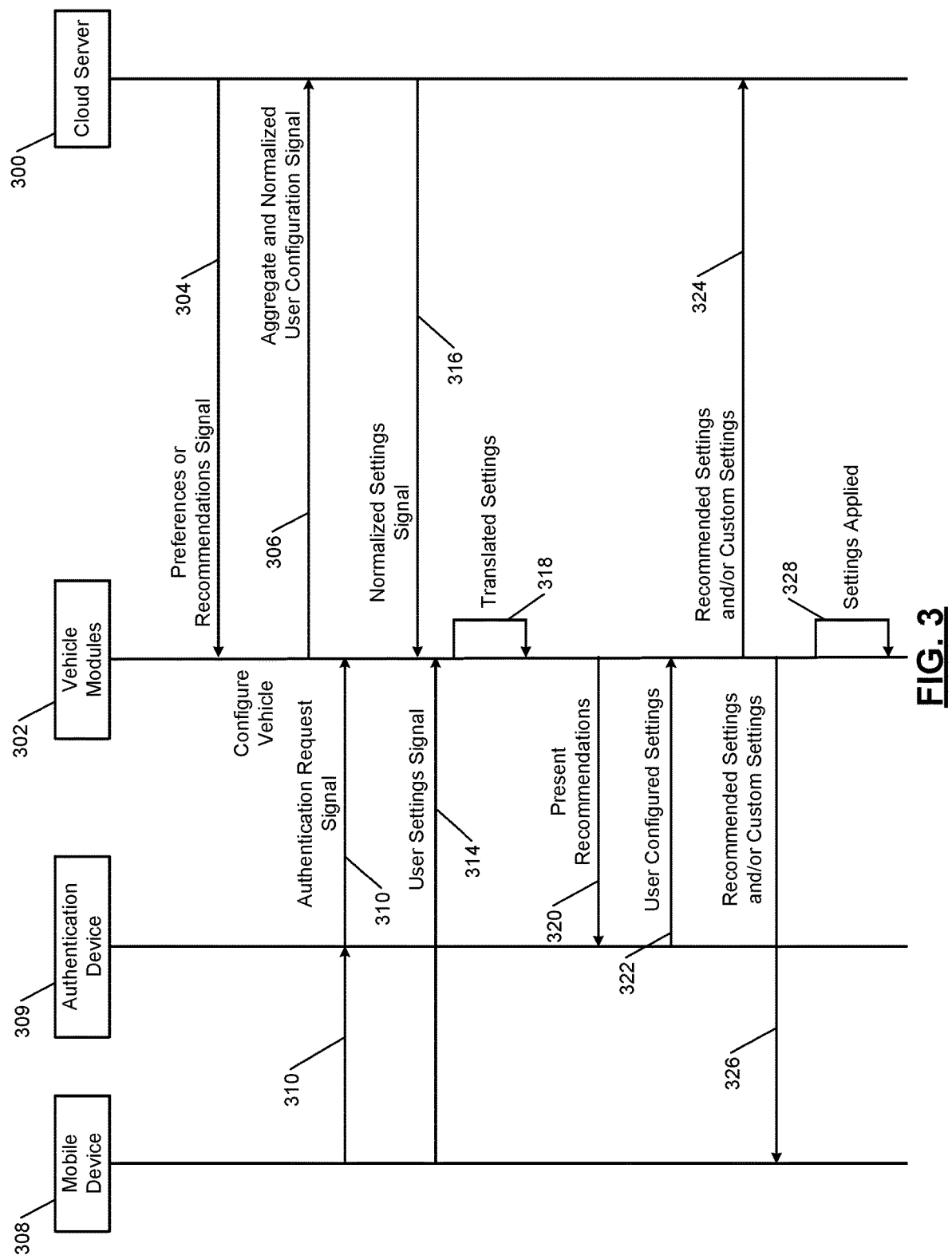
FIG. 3 is an example signal diagram illustrating an overview of a translation method in accordance with an embodiment of the present disclosure.

FIG. 3 shows an overview of a translation method. In the example translation method illustrated, the translation module may be located in a server 300 of a cloud-based network (hereinafter the "network") or in a vehicle. A memory of the network or the vehicle may store a normalized user profile based on previous users of the vehicle as a baseline. Normalized user profile may refer to a profile that includes parameters that have been normalized (converted to values within a predetermined range, such as values between 0 and 1 or values between −1 and 1) for easy application to any vehicle type. A baseline or updated user profile may be calculated and stored each time a user operates the vehicle. In one embodiment, the user profile is created in the network and then downloaded to one or more modules 302 of the vehicle, as represented by arrow 304. In another embodiment, the user profile is created in the vehicle and then uploaded to the network to form an aggregate and normalized user configuration for the vehicle in the network, as represented by arrow 306.

A user may be authenticated and authorized to access and operate the vehicle and utilize translation services based on credential information provided to and/or stored in the vehicle, a mobile device 308 and/or other authentication device 309 of the user. This information may be provided to the vehicle modules 302 directly or indirectly from the mobile device and/or the authentication device 309, as represented by arrows 310. The mobile device 308 may be a mobile phone, laptop computer, wearable device or other mobile device and communicate via, for example wireless fidelity (WiFi), long-term evolution (LTE) or other wireless local area network communication protocols. Examples of the authentication device 309 include a smart identification card, near field communication (NFC) card, a radio frequency identification (RFID) device, a smart key, a key fob, a fingerprint detection device including a fingerprint sensor, a face recognition device including a camera, a voice recognition device including a microphone, and/or other authentication device. The authentication device 309 may be incorporated in, connected to, or separate from and communicate with the mobile device 308 and/or the vehicle. The authentication device 309 may also communicate with the server.

The mobile device 308 may provide customization parameters compatible with a service available in the mobile device 308 to the modules 302 of the vehicle as represented by arrow 314. The customization parameters are the preferences of the user. These preferences can be updated in the vehicle and then later downloaded to the mobile device 308. The preferences may be transmitted between the mobile device and the vehicle directly or indirectly via the network. This may be via a gateway device located internal to or external to the vehicle. Similarly, the normalized user profile for that particular vehicle type may be obtained from the network if it does not already exist in the vehicle, as represented by arrow 316. This may include downloading preferences from the server 108 of FIG. 1 if not already stored in the vehicle.

The translation module may translate the user preferences for the vehicle as represented by arrow 318. The translation module may determine recommendations for the user based on the preferences of the user and/or preferences of other users and present the recommendations to the user via, for example, a display in the vehicle or a display of the mobile device. This is represented by arrow 320. The recommendations may be generated based on similarity score computations comparing similarities between users, preferences, user profiles, and vehicle types using, for example, machine learning algorithms. The user may adjust the recommended settings, which may be done via, for example, (i) the authentication device 309 as shown and represented by arrow 322, (ii) the mobile device 308, or (iii) the vehicle. The recommendations accepted by the current user are stored as part of corresponding profiles for that user. The recommendations may be stored in the network as represented by arrow 324, in the mobile device 308 as represented by arrow 326, and/or in the vehicle. The settings may be applied to the vehicle as controller area network (CAN) messages utilizing an open application programming interface (API) architecture based on methods described further below.

Figure 4:
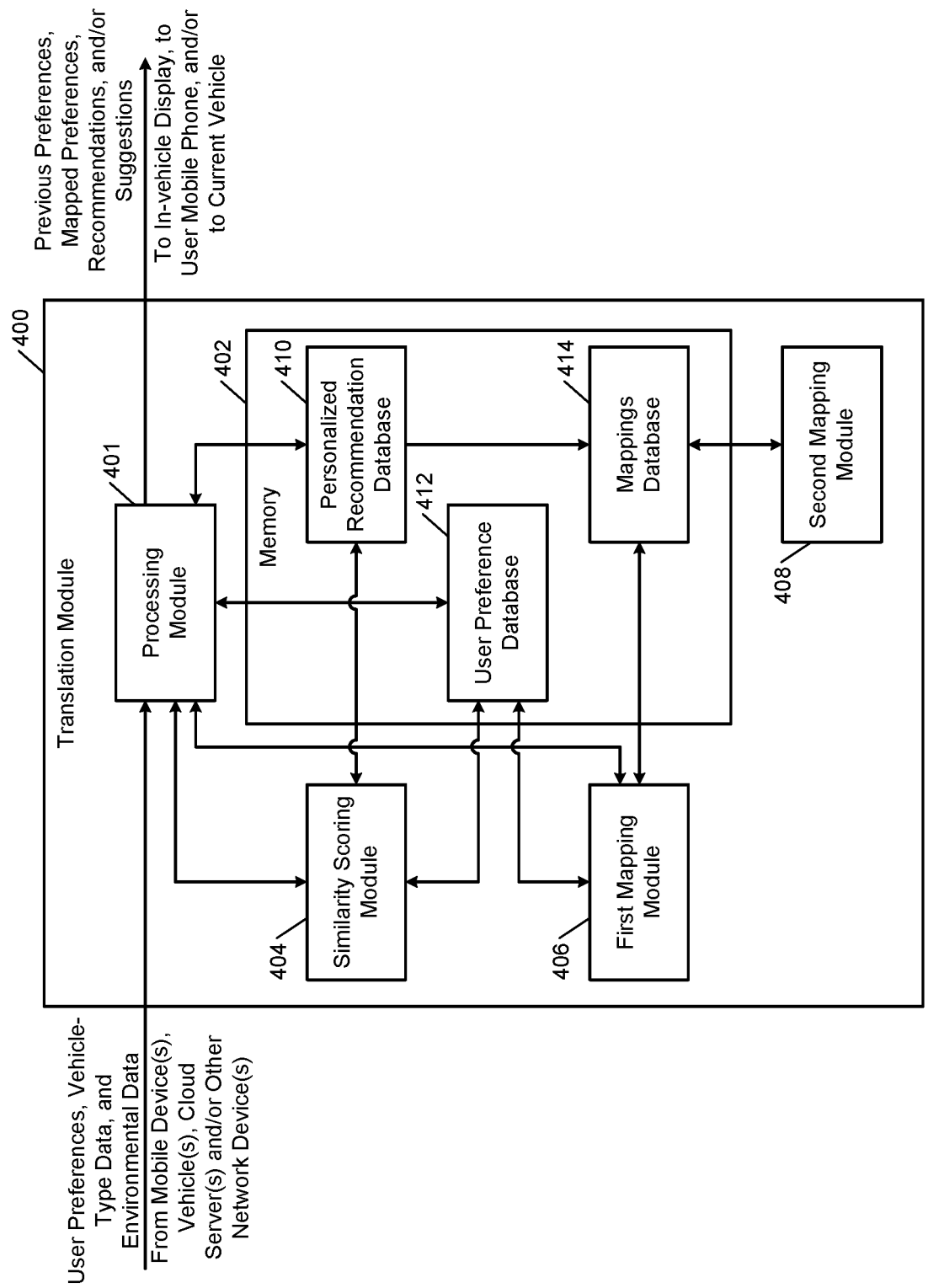
FIG. 4 is a functional block diagram of an example of a portion of the translation module in accordance with an embodiment of the present disclosure.

FIG. 4 shows an example of a portion of a translation module 400, such as the translation module 116 of FIG. 1 or the translation module 206 of FIG. 2. The translation module 400 includes a processing module 401, a memory 402, a similarity scoring module 404, a first mapping module 406 and a second mapping module 408. The memory 402 may store a personalized recommendation database 410, a user preference database 412, and a mappings database 414.

The processing module 401 may include the parameter adjustment module 212 of FIG. 2 and may receive, for example, user preferences (or profiles), vehicle type data and environmental data from bile devices, vehicles, cloud servers, and/or other network devices. The environmental data may include an ambient temperature, a time of day, traffic conditions and a purpose of a trip. The processing module 401 may output previous user preferences (or profiles), mapped preferences (or profiles) recommendations and/or suggestions. Recommendations may be provided as a result of computations using machine learning. Suggestions may refer to general rules. The processing module 401 receives the current vehicle type that user is using or about to be used. If applicable, the processing module 401 also receives current parameters set for and/or by the current user. If the user is about to operate a vehicle of a particular type, the previous preferences (if applicable) and recommendations are returned, applied and/or displayed. If the user already used the vehicle of the particular type, meaning the preferences were already set and applied on the vehicle, then the preferences may be stored and/or analyzed for future recommendations.

The similarity scoring module 404 automatically organizes user profiles into categories/groups based on the corresponding preferences, settings, demographics, and/or other grouping information. The first mapping module 406, based on the user preferences, maps parameters from a vehicle model A to a vehicle model B of a same or different type as vehicle A. The second mapping module 408, based on rules, maps preferences between vehicles of different types using mathematical derivations and calculations and/or manually inserted relationships. The personalized recommendation database 410 stores personalized recommendations based on assigned user categories and data in the mappings database 414.

The user preference database 412 stores the preferences selected by each user. The mapping database 414 stores possible mappings between user profiles for vehicles of the same or different types.

Figure 5:
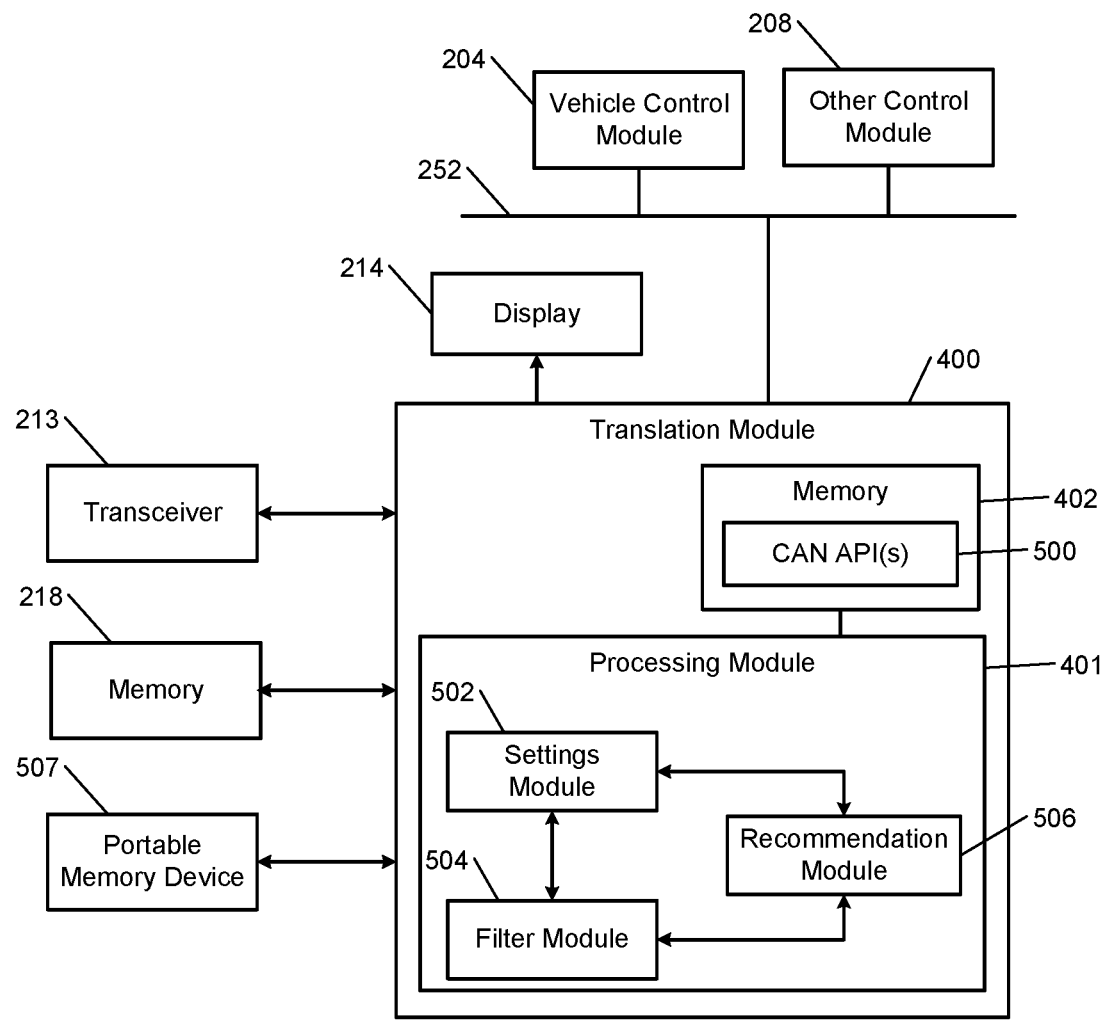
FIG. 5 is a functional block diagram of an example of another portion of the translation module in accordance with an embodiment of the present disclosure.

FIG. 5 shows another portion of the translation module 400 of FIG. 4. The portion includes the processing module 401 and the memory 402. The memory 402 may store CAN APIs 500. The processing module 401 may include a settings module 502, a filter module 504 and a recommendation module 506. The processing module 401 may be in communication with the vehicle control module 204 and/or other control modules 208 via the CAN bus 252. The translation module 400 may be connected to the memory 218, a portable memory device 507, the transceiver 213 and the display 214. The portable memory device 507 may include a plug-in memory card, a flash drive, or other portable memory device. The settings module 502 may determine, set, and/or update user preferences. The filter module 504 determines which codes are in CAN frames received via a CAN bus 252, as described below. The recommendation module 506 generates recommendations as described herein.

Figure 7:
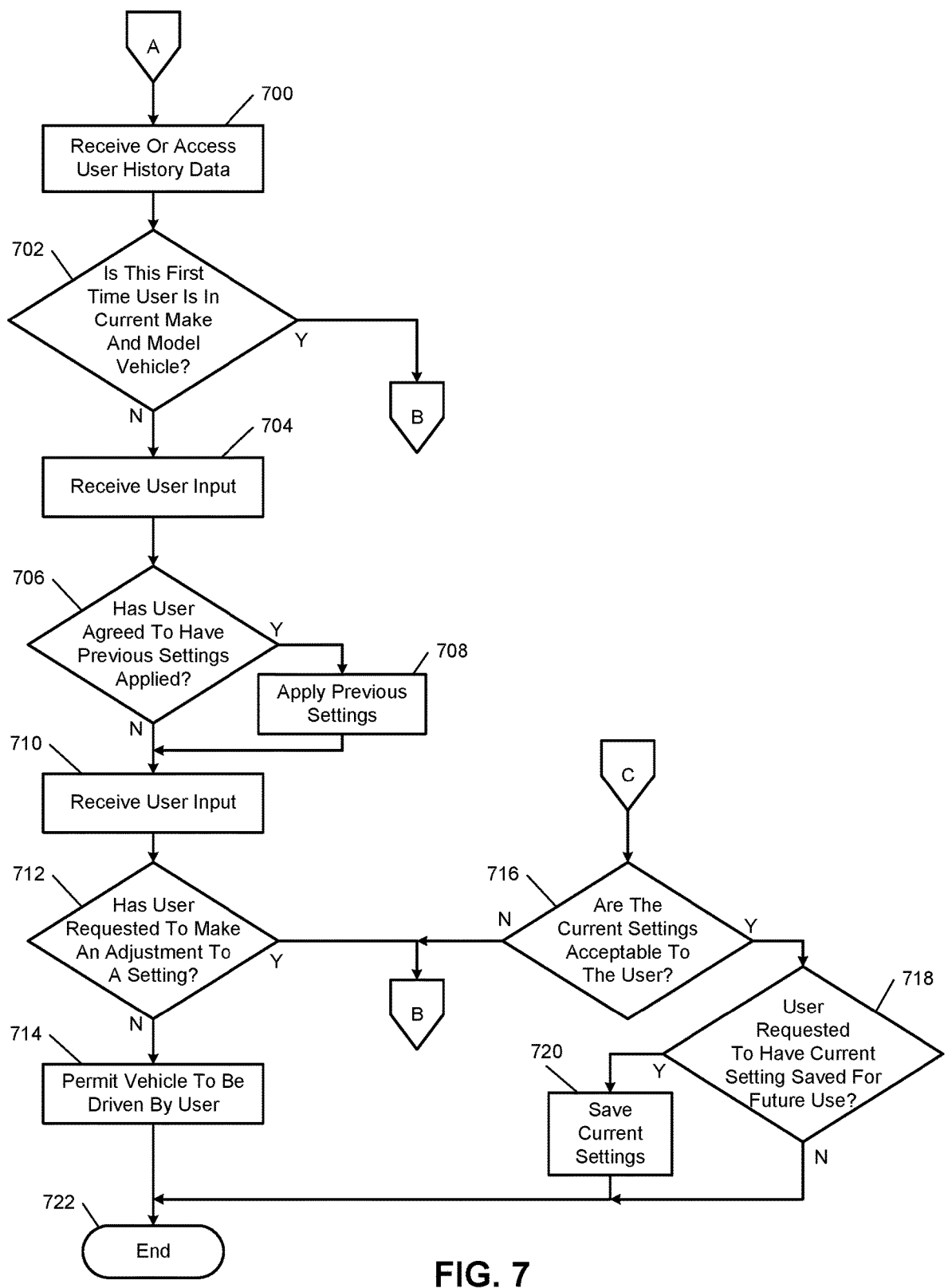
FIG. 7 illustrates an example of a first portion of a personalized parameter setting method in accordance with an embodiment of the present disclosure.
Figure 8:
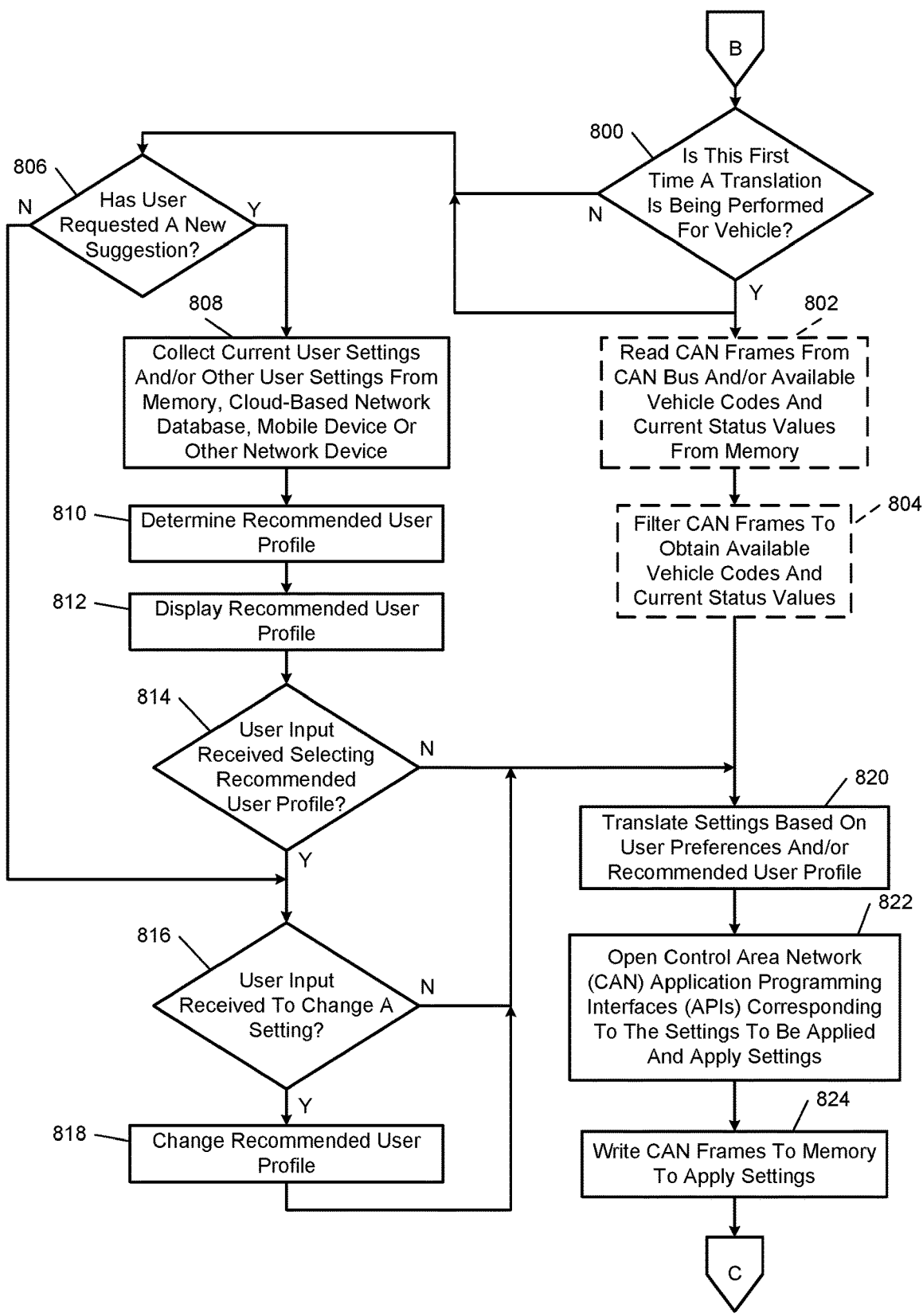
FIG. 8 illustrates an example of a second portion of the personalized parameter setting method in accordance with an embodiment of the present disclosure.

The systems disclosed herein may be operated using numerous methods, example methods are illustrated in FIGS. 3 and 6-9. In FIG. 6, an authentication method is shown. Although the methods are shown as separate methods, one or more of the methods and/or operations from separate methods may be combined and performed as a single method. For example, the methods of FIGS. 6-8 may be performed as a single method. Although FIGS. 6-8 are primarily described with respect to a translation module being located within a vehicle, the translation module may be located in a server of a cloud-based network as described above and the appropriate signals may be transmitted between the server and the vehicle in order to perform at least some of the operations of FIGS. 6-8. Although the following operations are primarily described with respect to the implementations of FIG. 6, the operations may be easily modified to apply to other implementations of the present disclosure. The operations may be iteratively performed. The method may begin at 600. At 602, a user approaches a vehicle to be accessed and operated. The user has a mobile device, such as one of the mobile devices referred to herein. The vehicle control module 204 receives an authentication input request from a touch pad on an exterior of the vehicle, the mobile device, or other network device.

At 604, the authorization module 211 determines whether the user is authorized to access an interior of the vehicle and/or to operate the vehicle. This may include comparing a digital key, password and/or signature received in the authentication input request with a predetermined digital key, password and/or signature. If there is a match, then the user is authorized and operation 606 is performed. If the user is not authorized, the method may end at 610.

At 606, the authorization module 211 permits access to the interior of the vehicle by, for example, unlocking the doors of the vehicle. At 608, the translation module 400 may determine whether the user is authorized for preference (or translation) services as described herein. This may be based on the same digital key, password and/or signature received at 602 or based on a different digital key, password and/or signature. In one embodiment, operations 604 and 608 are combined as a single operation allowing a user to be authorized during a single operation. If the user is authorized for preference services, then operation 700 of FIG. 7 may be performed, otherwise operation 610 may be performed.

FIG. 7 shows a first portion of a personalized parameter setting method. Although the following operations are primarily described with respect to the implementations of FIG. 7, the operations may be easily modified to apply to other implementations of the present disclosure. The operations may be iteratively performed. The method may begin at 700 at which the translation module 400 may receive access to history data including user profile data received from the mobile device, a server in a cloud-based network, other vehicles and/or memory 218. This data may be downloaded to the vehicle when the user is authorized for preference services.

At 702, the processing module 401 may determine whether this is a first time the user is in the current vehicle type (e.g., year, make, model and/or trim level). If yes, operation 800 of FIG. 8 may be performed, otherwise operation 704 is performed.

At 704, the processing module 401 receives a user input indicating whether the user has agreed to have previous parameters/preference settings applied. This may be based on a display of the previous parameters/preference settings on the display 214 and/or a signals generated signal requesting the same. The input may be received, for example, via the display 214, the mobile device, or other input device. At 706, if the user has agreed to have previous parameters/preference settings applied, then operation 708 is performed, otherwise operation 710 is performed.

At 708, the settings module 502 applies the previous parameters/preference settings by setting values, temperatures, channels, seat positons, lighting, and/or other parameters as disclosed herein. At 710, the settings module 502 receives another input from the user. This may be an indication of whether the user has requested an adjustment of one or more of the previous parameters/preference settings. At 712, the processing module 401 and/or the settings module 502 proceeds to operation 800 of FIG. 8 if the user has requested an adjustment or to operation 714 if no adjustment has been requested.

At 714, the vehicle control module 204 may permit the vehicle to be driven. This may occur in response to an indication signal from the processing module 401 indicating that the user is finished selecting and the processing module has finished setting the parameters.

The following operations 716, 718, 720 may be performed subsequent to performing, for example, operation 824 of FIG. 8. At 716, the settings module 502 determines whether the current parameters/preference settings are acceptable to the user. This may be based on an input received from the user via one of the input devices. If yes, operation 718 is performed, otherwise operation 720 is performed.

At 718, the settings module 502 determines whether the user has requested to have one or more current parameters/preference settings saved for future use. If yes, operation 720 may be performed, otherwise the method may end at 722. At 720, the settings module 502 saves the current parameters/preference settings in, for example, the memory 218. The method may end at 722 subsequent to operation 720.

FIG. 8 shows a second portion of the personalized parameter setting method. Although the following operations are primarily described with respect to the implementations of FIG. 8, the operations may be easily modified to apply to other implementations of the present disclosure. The operations may be iteratively performed. The method may begin at 800 at which the processing module 401 may determine whether this is a first time a translation is being performed for the vehicle. If this is a first time, operation 802 is performed, otherwise operation 806 is performed.

At 802, the filter module 504 may read CAN frames from the CAN bus 210 and/or available vehicle codes and current status values from the memory 218. The filter module 504 may store codes possibly used by the vehicle (depending on the year, make, model, trim level, etc.) and detect which of these codes are being used. The CAN frames may include control codes that are available (i.e. being used and may be adjusted). For example, the vehicle may have particular codes for seat angles, lumbar pressures, passenger temperatures, driver temperatures, fan speeds, steering wheel temperature, radio channels, radio volumes, and other parameters and corresponding status values.

Operations 802, 804 may be performed while operations 806, 808, 810, and 812 are performed. At 804, the filter module 504 filters the CAN frames to obtain the available vehicle codes and current status values. This information may be provided to the settings module 502 and/or the recommendation module 506. Operation 820 may be performed subsequent to performing operation 804.

At 806, the settings module 502 determines whether the user has requested a new suggestion. This may be based on another received user input. If the user has requested a new suggestion, operation 808 is performed, otherwise operation 816 may be performed.

At 808, the settings module 502 collects current user parameters/preference settings and/or other user parameters/preference settings from the memory 218, a cloud-based network database, the mobile device, other network device. This may include receiving normalized parameters/preference settings from the mobile device, server, or other device, such as a plug-in memory card. The other device may be plugged into an accessory port, such as a memory card or flash drive port (e.g., universal serial bus (USB) port) in the vehicle. An example of the other device is the portable memory device 507 of FIG. 5.

At 810, the recommendation module 506 determines a recommended user profile for the user and the vehicle. This is based on the parameters/preference settings collected at 808 and/or other aggregated user profile data, average data, and/or data applicable to the user and the vehicle. This may include some of the operations of the method of FIG. 9. At 812, the recommended user profile is displayed for the user.

At 814, the recommendation module 506 determines whether a user input has been received selecting the recommended user profile. If the user selects the recommended user profile, then operation 816 is performed, otherwise operation 820 is performed. At 816, the settings module 502 determines whether a user input has been received to change a parameter/preference setting. If yes, operation 818 is performed, otherwise operation 820 is performed. At 818, the recommended user profile is changed based on the user changes at 816.

At 820, the settings module translates the parameters/preference settings for the current vehicle if needed to provide resulting parameters/preference settings. This may be based on the collected preferences of the user and/or other users and/or the recommended user profile. The codes of one or more previously operated vehicles may be translated to the codes of the current vehicle and the status values of the codes for the previously operated vehicles may be weighted, averaged and/or adjusted to provide the settings for the codes of the current vehicle. The status values for the previously operated vehicles may be adjusted based on differences between, for example, vehicle dimensions, part sizes, demographics of operators/users, etc. to better correspond to the current vehicle and current user. This is done to provide a parameter set for the current vehicle and user that is essentially equivalent to one or more parameter sets for: the user and a vehicle of the same type as the current vehicle; one or more other users and/or one or more other vehicles of the same type as the current vehicle; and/or the user and/or one or more other users of other vehicles of different types than the current vehicle. The equivalent parameter set(s) provide a seamless experience for the current user. Operation 820 may include some of the operations of the method of FIG. 9.

At 822, the processing module 401 may open (or execute) and/or initiate opening (or executing) one or more CAN APIs corresponding to the resulting parameters/preference settings to be applied. The CAN APIs may apply at least some of the resulting parameters/preference settings. The resulting parameters/preference settings may include identifiers, codes and corresponding values to be set. At 824, the processing module 401 may store the parameters/preference settings to be applied in the memory 218. This may include uploading the parameters/preference settings to be applied to the server and/or downloading the parameters/preference settings to be applied to the mobile device. Operation 716 of FIG. 7 may be performed subsequent to operation 824.

Figure 9:
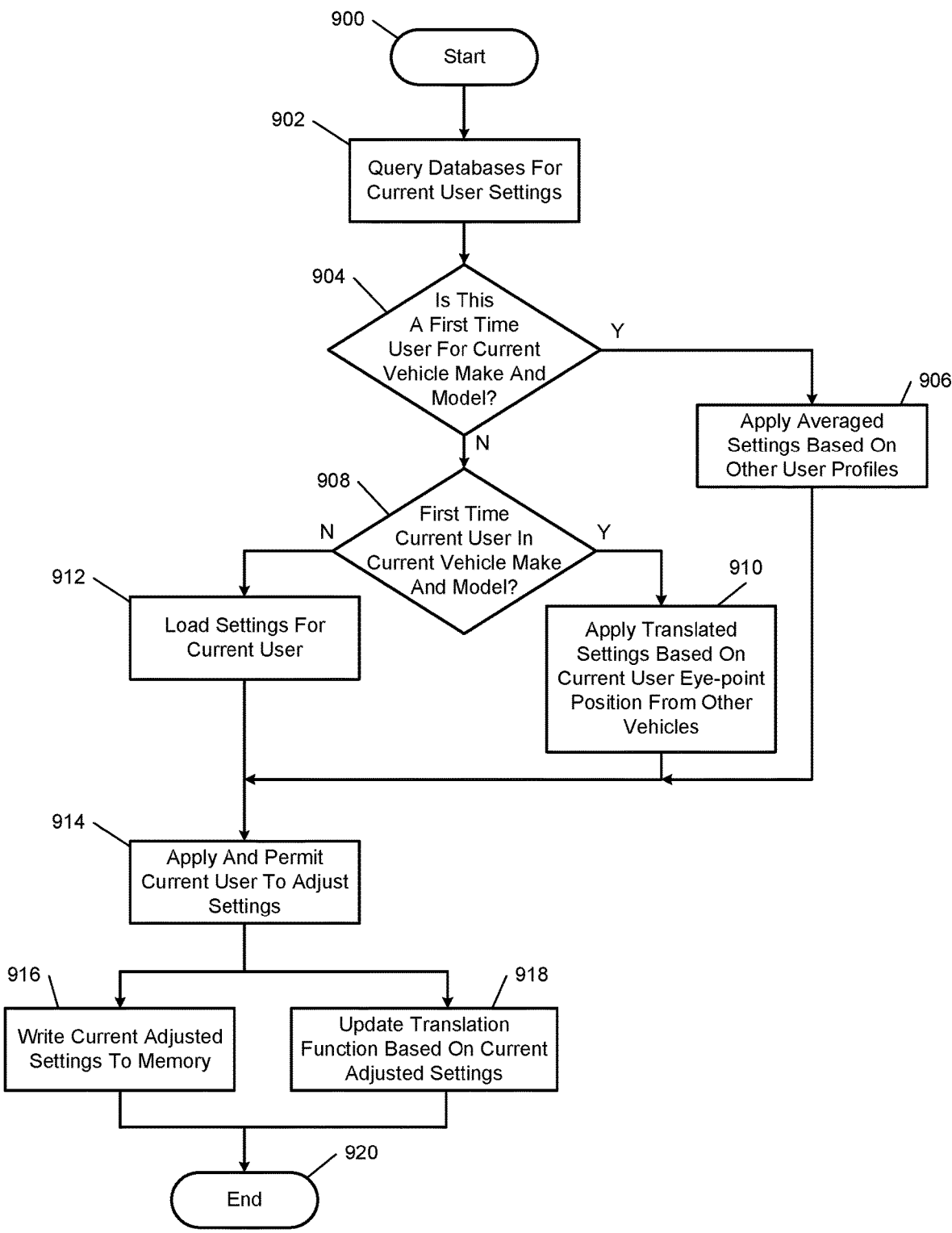
FIG. 9 illustrates an example of another personalized parameter setting method in accordance with an embodiment of the present disclosure.

FIG. 9 shows another personalized parameter setting method. Although the following operations are primarily described with respect to the implementations of FIG. 9, the operations may be easily modified to apply to other implementations of the present disclosure. The operations may be iteratively performed. The method may begin at 900. At 902, the settings module 502 may query databases (e.g., the databases 410, 412 for current user settings. This may include receiving normalized parameters/preference settings from the mobile device or server.

At 904, the processing module 401 determines whether this is a first time user of the translation services. If this is a first time user, then operation 906 is performed, otherwise operation 908 is performed.

At 906, the settings module 502 may apply average settings based on other user profiles for the current vehicle. As an example, the average settings may be determined by calculating one or more probabilities according to equation 1, where P is a probability value, X refers to one or more parameters, i identifies the current user, U is the variable set to i, m is the current type of vehicle, M is the variable set to m, j is an integer, N is a number of user profiles, and n is an integer.

$$P(X \mid U = i, M = m) = \frac{1}{N}\sum_{j} P(X \mid U = j, M = n) \quad (1)$$

As an example, X may refer to any number of parameters and may include continuous correlated values c1, c2, c3 . . . and/or discontinuous (or discrete) values d1, d2, d3 . . . . One or more of the continuous correlated values and/or one or more of the discrete values may be independent of the type of vehicle. The continuous correlated values may have an infinite number of settings. The discrete values may have a predetermined number of settings. For example, a discrete value may indicate (i) ON or OFF settings, or (ii) HIGH, LOW, OFF settings. Operation 914 may be performed subsequent to operation 906.

At 908, the processing module 401 determines whether this is a first time that the user has operated the vehicle and a vehicle of this type. If yes, operation 910 is performed, otherwise operation 912 is performed.

At 910, the settings module 502 applies translated settings based on current user eye-point position from other vehicles. This may include providing recommendations as described above and then applying a selected recommendation and/or a portion thereof. The recommendations may be based on (i) preferences of the current user that were previously applied in other vehicles, and/or (ii) preferences of other users for this vehicle. The preferences of the current user that were previously used in other vehicles (i) may be independent of whether the other vehicles are similar to the current vehicle, or (ii) may only be for other vehicles similar to the current vehicle. As an example, a translation may be performed using equation 2.

$$P(X \mid U=i, M=m) = f(P(X \mid U=i, M=n)) \quad (2)$$

At 912, if the current user has been in this vehicle type before, the user is provided with an option to apply the previous preferences of the current user or to adjust the previous preferences. The adjustments may be performed at 914.

At 914, parameters/preference settings may be adjusted by the user and applied by the settings module 502. If applied settings are not found acceptable to the user, then the user may adjust the parameters. If the parameters/preference settings are not acceptable to the user, then the user adjusts the settings (optionally with new suggestions) until the parameters/preference settings are found acceptable to the user. When parameters are set as desired by the user, then the user may be permitted to drive the vehicle. The user may provide an input indicating that the parameters/preference settings are acceptable. Based on the preferences of the current user, some parameters/preference settings may automatically be applied or the settings module 502 may request approval from the user prior to enabling them.

Operations 916 and 918 may be performed subsequent to operation 914. At 916, the current parameters/preference settings may be optionally written to the memory 218 and/or be sent to the server, the mobile device and/or one or more other vehicles. The parameters/preference settings are saved for future use.

Some of the parameters/preference settings may be restricted due to vehicle owner/provider policies and/or regional restrictions and/or regulations. This means that some of the parameters/preference settings may be performed for use in the current vehicle and for the current user and while in a certain geographical region, but may not be permitted or limited in use for one or more other vehicles, users and/or other geographical regions.

At 918, the processing module 401 may update a translation function based on the currently selected and set preferences. The method may end at 920 subsequent to operations 916, 918.

The above-described operations of FIGS. 6-9 are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system for setting parameters within a first vehicle for a first user of the first vehicle, the system comprising:
   a memory configured to store a plurality of normalized parameters, wherein normalized parameters refer to parameters that have been converted to values within a predetermined range for application to a plurality of different vehicle types, wherein the plurality of normalized parameters are specific to the first user, and wherein each of the plurality of normalized parameters is a parameter of the first vehicle;
a transceiver configured to receive at least some of the plurality of normalized parameters from at least one of a mobile device of the first user, a server in a cloud-based network, or a portable memory device; and
a processing module configured to
determine, based on credential information, (i) whether the first user is authenticated and authorized to access and operate the first vehicle, and (ii) whether the first user is authorized to utilize parameter translation services, the processing module is configured to determine whether the first user is authorized to utilize parameter translation services separate from determining whether the first user is authenticated and authorized to access and operate the first vehicle,
based on the first user being authenticated and authorized to access and operate the first vehicle, permitting access to an interior of the first vehicle,
based on the first user being authorized for the parameter translation services, translate the plurality of normalized parameters to resultant parameters based on a profile of parameters of the first vehicle or a second vehicle, and the profile of parameters is specific to a second user,
generate parameter recommendations based on the resultant parameters,
present the parameter recommendations to the first user, and
adjust current parameters of the first vehicle based on (i) the resultant parameters, and (ii) a received response from the first user with regards to the parameter recommendations.

2. The system of claim 1, wherein the transceiver is configured to receive first ones of the plurality of normalized parameters from the mobile device and second ones of the plurality of normalized parameters from the server.

3. The system of claim 1, wherein the transceiver is configured to receive some of the plurality of normalized parameters from one or more vehicles other than the first vehicle, the one or more vehicles including the second vehicle.

4. The system of claim 1, wherein the processing module is configured to receive the plurality of normalized parameters from the portable memory device.

5. The system of claim 1, wherein at least some of the plurality of normalized parameters are specific to the first vehicle.

6. The system of claim 1, wherein:
the transceiver is further configured to receive second parameters from at least one of the server of the cloud-based network or one or more vehicles other than the first vehicle, the one or more vehicles including the second vehicle; and
the processing module is configured to generate the resultant parameters based on the second parameters.

7. The system of claim 1, wherein at least some of the plurality of normalized parameters are parameters for the first user and the first vehicle previously stored based on settings established when the first user previously operated the first vehicle.

8. The system of claim 1, wherein the plurality of normalized parameters include parameters set for the first user and the second vehicle or a third vehicle.

9. The system of claim 8, wherein the plurality of normalized parameters do not include parameters set for the first user and the first vehicle.

10. The system of claim 1, wherein the processing module is configured to:
reading controller area network frames from a controller area network bus;
determining which particular vehicle codes are (i) available, (ii) being used by a particular year, make, model, and trim level of the first vehicle, and (iii) are adjustable;
determining status values corresponding to the particular vehicle codes based on the controller area network frames; and
based on the particular vehicle codes and the status values, translate the plurality of normalized parameters to the resultant parameters.

11. The system of claim 10, wherein the particular vehicle codes are for seat angles and lumbar pressures.

12. The system of claim 10, wherein the particular vehicle codes are for passenger temperatures, driver temperatures, fan speeds, and steering wheel temperature.

13. The system of claim 10, wherein the particular vehicle codes are for radio channels and radio volume levels.

14. The system of claim 1, wherein the processing module is configured to, while generating the parameter recommendations:
determine if the first user is a first time user of the parameter translation services;
determine if the first user is operating the first vehicle for a first time; and
based on the first user being the first time user of the parameter translation services or the first user using the first vehicle for a first time, generating the parameter recommendations based on (i) parameters set in the first vehicle for one or more users other than the first user, and (ii) parameters set for the first user in one or more vehicles other than the first vehicle, the one or more users including the second user, and the one or more vehicles including the second vehicle.

15. The system of claim 1, wherein:
the processing module is configured to, when providing the parameter translation services, determine similarity scores to determine a recommended set of parameters to recommend to the first user;
the similarity scores are generated based on similarities between a profile of the plurality of normalized parameters of the first user and one or more profiles of normalized parameters of one or more other users, the one or more other users including the second user;
the profile of the plurality of normalized parameters of the first user includes parameters of the first vehicle or one or more other vehicles, the one or more other vehicles including the second vehicle; and
the one or more profiles of the normalized parameters of the one or more other users include parameters for the first vehicle or the one or more other vehicles.

16. The system of claim 1, wherein:
the processing module is configured to, determine a probability of parameters to determine a set of parameters to recommend to the first user; and
the probability of parameters is generated based on one or more averages of corresponding parameters set for (i) a plurality of users, and (ii) the first vehicle or one or more other vehicles, the plurality of users including the second user.

17. The system of claim 1, wherein normalized parameters are parameters converted to values between 0 and 1 or between −1 and 1.

18. The system of claim 1, wherein:
the processing module is configured to, when the first user is authorized to utilize the parameter translation services, translate a user profile of normalized parameters for the second vehicle or a third vehicle to a user profile of the plurality of normalized parameters for the first vehicle; and
the resultant parameters are particular to the first vehicle.

19. The system of claim 1, wherein:
each of the plurality of normalized parameters is a user adjustable setting of the first vehicle; and
the plurality of normalized parameters include at least one of a door locking and unlocking policy, a lighting parameter, a vehicle-to-infrastructure parameter, a security parameter, or a dashboard parameter.

20. The system of claim 1, wherein:
each of the plurality of normalized parameters is a user adjustable setting of the first vehicle; and
the plurality of normalized parameters include a door locking and unlocking policy, a lighting parameter, a vehicle-to-infrastructure parameter, a security parameter, and a dashboard parameter.

21. The system of claim 1, wherein the processing module is configured to:
determine whether the first user is authenticated and authorized to access and operate the first vehicle based on at least one of a first digital key, a first password or a first signature; and
determine whether the first user is authorized to utilize parameter translation services based on at least one of a second digital key, a second password or a second signature.

22. The system of claim 21, wherein the processing module is configured to, based on the first user being authorized for the parameter translation services and subsequent to the first user being permitted access to the interior of the first vehicle, translate the plurality of normalized parameters to the resultant parameters.

23. A method of setting parameters within a first vehicle for a first user of the first vehicle, the method comprising:
storing in one or more memories a plurality of normalized parameters, wherein normalized parameters refer to parameters that have been converted to values within a predetermined range for application to a plurality of different vehicle types, wherein the plurality of normalized parameters are specific to the first user, and wherein each of the plurality of normalized parameters is a parameter of the first vehicle;
receiving at least some of the plurality of normalized parameters from at least one of a mobile device of the first user, a server in a cloud-based network, or a portable memory device;
determining, based on credential information, whether the first user is authenticated and authorized to access and operate the first vehicle, and (ii) whether the first user is authorized to utilize parameter translation services, wherein determining whether the first user is authorized to utilize parameter translation services is performed separate from determining whether the first user is authenticated and authorized to access and operate the first vehicle;
based on the first user being authenticated and authorized to access and operate the first vehicle, permitting access to an interior of the first vehicle;
based on the first user being authorized for the parameter translation services, translating the plurality of normalized parameters to resultant parameters based on a profile of parameters of the first vehicle or a second vehicle, and the profile of parameters is specific to a second user;
generating parameter recommendations based on the resultant parameters;
presenting the parameter recommendations to the first user; and
adjusting current parameters of the first vehicle based on (i) the resultant parameters, and (ii) a received response from the first user with regards to the parameter recommendations.

24. The method of claim 23, wherein:
first ones of the plurality of normalized parameters are received from the mobile device;
second ones of the plurality of normalized parameters are received from the server; and
third ones of the plurality of normalized parameters are received from one or more vehicles other than the first vehicle.

25. The method of claim 23, further comprising receiving second parameters from at least one of the server of the cloud-based network or one or more vehicles other than the first vehicle,
wherein the resultant parameters are generated based on the second parameters.

26. The method of claim 23, wherein
at least some of the plurality of normalized parameters are parameters set for the first user and the first vehicle previously stored based on settings established when the first user previously operated the first vehicle;
the plurality of normalized parameters include parameters set for the first user and the second vehicle; and
the plurality of normalized parameters do not include parameters set for the first user and the first vehicle.

27. The method of claim 23, further comprising:
reading controller area network frames from a controller area network bus;
determining which vehicle codes are available and corresponding status values based on the controller area network frames; and
based on the vehicle codes and the status values, translating the plurality of normalized parameters to the resultant parameters.

28. The method of claim 23, further comprising, while generating the parameter recommendations:
determining if the first user is a first time user of the parameter translation services;
determining if the first user is operating the first vehicle for a first time; and
based on the first user is the first time user of the parameter translation services or the first user is using the first vehicle for a first time, generating the recommendations based on (i) parameters set in the first vehicle for one or more users other than the first user, and (ii) parameters set for the first user in one or more vehicles other than the first vehicle, the one or more users including the second user, and the one or more vehicles including the second vehicle.

29. The method of claim 23, further comprising determining similarity scores to determine a recommended set of parameters to recommend to the first user, wherein:
the similarity scores are generated based on similarities between a profile of parameters of the first user and one or more profiles of parameters of one or more other users, the one or more other users including the second user;

the profile of parameters of the first user includes parameters of the first vehicle or one or more other vehicles, the one or more vehicles including the second vehicle; and the one or more profiles of parameters of the one or more other users include parameters for the first vehicle or the one or more other vehicles.

\* \* \* \* \*

UNITED STATES PATENT AND TRADEMARK OFFICE
CERTIFICATE OF CORRECTION

| | | |
|---|---|---|
| PATENT NO. | : 11,267,415 B2 | Page 1 of 1 |
| APPLICATION NO. | : 16/001439 | |
| DATED | : March 8, 2022 | |
| INVENTOR(S) | : Ravi Akella et al. | |

It is certified that error appears in the above-identified patent and that said Letters Patent is hereby corrected as shown below:

In the Claims

Column 21, Claim 29, Line 3: before "vehicles", insert --other--

Signed and Sealed this
Tenth Day of May, 2022

Katherine Kelly Vidal
*Director of the United States Patent and Trademark Office*